United States Patent
Thomas et al.

(10) Patent No.: US 10,941,668 B2
(45) Date of Patent: Mar. 9, 2021

(54) ASSEMBLY FOR A TURBOMACHINE COMPRISING A DISTRIBUTOR, A STRUCTURAL ELEMENT OF THE TURBOMACHINE, AND AN ATTACHMENT DEVICE

(71) Applicant: SAFRAN AIRCRAFT ENGINES, Paris (FR)

(72) Inventors: Axel Sylvain Loïc Thomas, Moissy-Cramayel (FR); Maurice Guy Judet, Moissy-Cramayel (FR); Gabrijel Radeljak, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 169 days.

(21) Appl. No.: 16/300,153

(22) PCT Filed: May 5, 2017

(86) PCT No.: PCT/FR2017/051096
§ 371 (c)(1),
(2) Date: Nov. 9, 2018

(87) PCT Pub. No.: WO2017/194865
PCT Pub. Date: Nov. 16, 2017

(65) Prior Publication Data
US 2019/0203605 A1 Jul. 4, 2019

(30) Foreign Application Priority Data
May 9, 2016 (FR) ...................................... 1654136

(51) Int. Cl.
*F01D 9/04* (2006.01)
*F01D 25/24* (2006.01)

(52) U.S. Cl.
CPC ............ *F01D 9/042* (2013.01); *F01D 25/246* (2013.01); *F05D 2230/64* (2013.01); *Y02T 50/60* (2013.01)

(58) Field of Classification Search
CPC . F01D 9/042; F01D 9/04; F01D 9/041; F01D 25/24; F01D 25/243; F01D 25/246;
(Continued)

(56) References Cited

U.S. PATENT DOCUMENTS

| 8,182,202 B2 | 5/2012 | Bart et al. | |
| 2004/0156719 A1* | 8/2004 | Czachor | F01D 9/042 415/209.4 |
| 2014/0314550 A1* | 10/2014 | Jenkinson | F01D 9/042 415/148 |

FOREIGN PATENT DOCUMENTS

| EP | 1445426 A2 | 8/2004 |
| EP | 1921273 A1 | 5/2008 |

(Continued)

OTHER PUBLICATIONS

International Patent Application No. PCT/FR2017/051096, International Search Report and Written Opinion dated Jul. 6, 2017, 7 pgs. (relevance found in citations and English International Search Report).

*Primary Examiner* — David E Sosnowski
*Assistant Examiner* — Danielle M. Christensen
(74) *Attorney, Agent, or Firm* — Lathrop GPM LLP

(57) ABSTRACT

Assembly (2) comprising an annular turbine distributor (3) for turbomachinery (1), an annular structural element (4) of the turbomachinery (1), coaxial with the distributor (3) and at least one device (5) for attaching the annular distributor (3) with the annular structural element (4), characterised in that: —the annular distributor (3) is crossed by at least two axial passages, and —the or each attachment device (5) comprises: at least two pins (15), rigidly connected to the
(Continued)

annular structural element (4) and passing through one of said passages of the distributor (3), a first transverse stop (16) for stopping the distributor (3) axially and passing through two consecutive pins (15), and two second stops (17) rigidly connected to the structural element (4) to retain, in the pins (15), the first transverse stop (16) for stopping the distributor (3) radially.

13 Claims, 4 Drawing Sheets

(58) Field of Classification Search
CPC ............. F05D 2230/64; F05D 2240/14; F05D 2240/90; F05D 2240/91; F05D 2260/31
See application file for complete search history.

(56) References Cited

FOREIGN PATENT DOCUMENTS

| | | | |
|---|---|---|---|
| EP | 2594743 | A1 | 5/2013 |
| FR | 2908153 | | 5/2008 |

\* cited by examiner

ASSEMBLY FOR A TURBOMACHINE COMPRISING A DISTRIBUTOR, A STRUCTURAL ELEMENT OF THE TURBOMACHINE, AND AN ATTACHMENT DEVICE

CROSS-REFERENCE TO RELATED APPLICATIONS

This application is a 35 U.S.C. § 371 filing of International Application No. PCT/FR2017/051096, filed May 5, 2017, which claims the benefit of priority to French Patent Application No. 1654136, filed May 9, 2016, each of which is incorporated herein by reference in its entirety.

The present invention relates to the attachment of a distributor on turbomachinery.

Turbomachines, whether of the turboprop or turbojet types, comprise annular distributors mounted along an axis of the turbomachinery, around which the movable elements of the turbomachinery rotate. Such distributors make it possible to guide and/or straighten up an air flow passing through the turbomachinery, in the downstream direction.

In the following description, it should be understood that the terms "upstream" and "downstream" are defined relative to the direction of flow or circulation of a fluid, such as air, through the turbomachinery, with upstream defining the direction from which the fluid comes to a member such as a distributor, and downstream defining the direction to which the fluid goes over the member.

Similarly, the term "axial" relates to an axis along which the air flows in the downstream direction and which is an axis of revolution of the turbomachinery. The term "radial" refers, in turn, to a direction substantially perpendicular to the axial direction.

Distributors may consist of a single piece comprising a first portion forming an outer shroud, a second portion forming an inner shroud and a third portion forming vanes joining the inner shroud and the outer shroud, or an assembly of several parts, called sectors, each comprising a vane, an outer shroud portion and an inner shroud portion.

The distributors are mounted and attached on structural elements of the turbomachinery, for example a stationary casing of the turbomachinery.

A known principle for attaching a distributor, and more particularly distributor sectors, described in French Patent FR 2,908,153, in the name of the Applicant, consists in mounting the sectors onto the casing using bolts (screw/nut sets) and a part for holding same engaged with the inner shroud portion of the sector and the casing.

Although this principle ensures a correct attachment of the sectors on the casing, it has some drawbacks.

As a matter of fact, such attachment principle requires using tools for handling bolts and much strength from the mounting operator.

In addition, the reduced accessibility to the inner shroud and the attachment complexity makes the implementation of this principle a long issue.

The invention more particularly aims at remedying such drawbacks by providing simple, quick and lasting means for mounting a distributor onto a stationary structural element, such as a casing of a turbomachinery.

For this purpose, the invention first provides for an assembly comprising an annular turbine distributor of a turbomachinery, an annular structural element of the turbomachinery, coaxial with the distributor and at least one device for attaching the annular distributor with the annular structural element, characterized in that:

the annular distributor is crossed by at least two axial passages, and
the or each attachment device comprises:
at least two pins, which are secured to the annular structural element and passing through one of said passages of the distributor, with each pin being further crossed by a through-opening,
a first transverse stop for stopping the distributor axially and passing through the openings of the two pins or two consecutive pins, and
two second stops for retaining the first transverse stop for stopping the distributor axially, connected to the structural element to retain the first transverse stop in the openings of the pins.

To achieve a simple and low-cost product, it can be provided that:
the annular structural element has at least a first hole and a second hole;
the pins are movable relative to the structural element and each passes through a first hole;
the second stops circumferentially retaining the first transverse stop for stopping the distributor axially are each accommodated in a second hole; and/or that
each second retaining stop is movable relative to the structural element and is accommodated in a space of the annular distributor.

Such characteristics thus make it possible for the various component parts of the set to have a simple design and to be manufactured independently of each other, specifically to facilitate maintenance and, if necessary, replacement of only one of the parts.

The annular structural element advantageously has, on a radial external edge, at least two lugs positioned circumferentially away from one another, each having at least one first hole and one second hole, and the annular distributor comprises at least two tabs positioned circumferentially away from one another and each having a passage adapted to come opposite the first hole of a lug of the annular structural element.

Lugs and tabs make it possible to reduce the overall dimensions of the structure and the distributor respectively in particular in order to reduce the mass of the assembly and, consequently, the mass of the turbomachinery.

For ease of maintenance and reduced downtime of the turbomachinery specifically, the distributor comprises a plurality of circumferentially adjacent distributor sectors, with each distributor comprising at least two passages and at least one portion of a space.

To facilitate the operators' work when mounting the distributor onto the stationary structure, at least one of the passages of the distributor or of each sector has a diameter greater than the diameter of the pins.

The pins are advantageously stops for circumferentially stopping the distributor, for limiting the movement of the distributor, in particular during assembling and maintenance operations.

The invention secondly relates to a method for assembling the assembly as previously described, which comprises at least a first attachment device and a second, adjacent, attachment device and sharing one of the second stops, with the method comprising the following steps:
positioning the two pins of the first attachment device on the annular structural element;
positioning the two second stops of the first attachment device in a retracted position;

inserting the first stop of the first attachment device through the openings of the pins of the first attachment device;

shifting the first stop of the first attachment device in a direction opposite the second attachment device;

positioning the two pins of the second attachment device on the annular structural element;

inserting the first stop of the second attachment device through the openings of the pins of the second attachment device;

positioning the second stops of the two attachment devices in a locking position, with one of the second stops then locking the first stops of the two attachment devices.

Advantageously, the method comprises a step of positioning the two pins of the first attachment device and the second attachment device on the annular structural element which is carried out prior to the positioning of the first stop of the first attachment device and the second attachment device respectively.

The invention will be better understood and other details, characteristics and advantages of the invention will become apparent when reading the following description given as a non restrictive example, while referring to the appended drawings in which.

Figure 1:
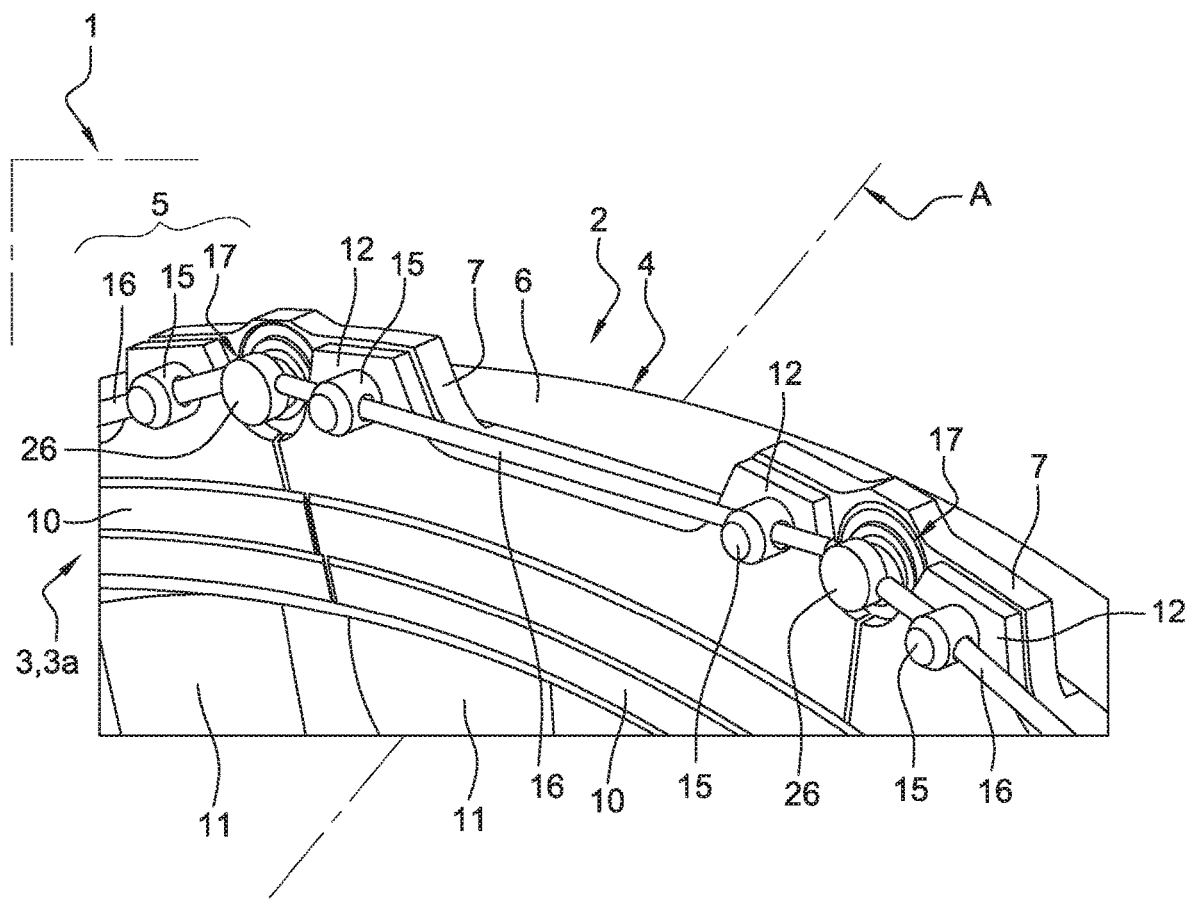
FIG. 1 is a detailed top view in perspective showing an assembly comprising an annular turbine distributor for turbomachinery, an annular structural element of a turbomachinery turbine, coaxial with the distributor and a device for attaching the annular distributor to the annular structural element.

FIG. 1 shows a detailed view of a turbomachinery 1 provided with an assembly 2 comprising one annular turbine distributor 3 for turbomachinery 1, an annular structural element of the turbomachinery turbine 1, coaxial with the distributor 3 relative to an axis A, and at least one device 5 for attaching the annular distributor 3 with the annular structural element 4, with only one attachment device 5 being visible in its entirety in FIG. 1.

The annular structural element 4 may for example be a casing of a high pressure turbine externally provided with a ring for controlling, by impact of air, the annular clearance between the radially external end of a high pressure turbine wheel and a block of abradable material.

Figure 2:
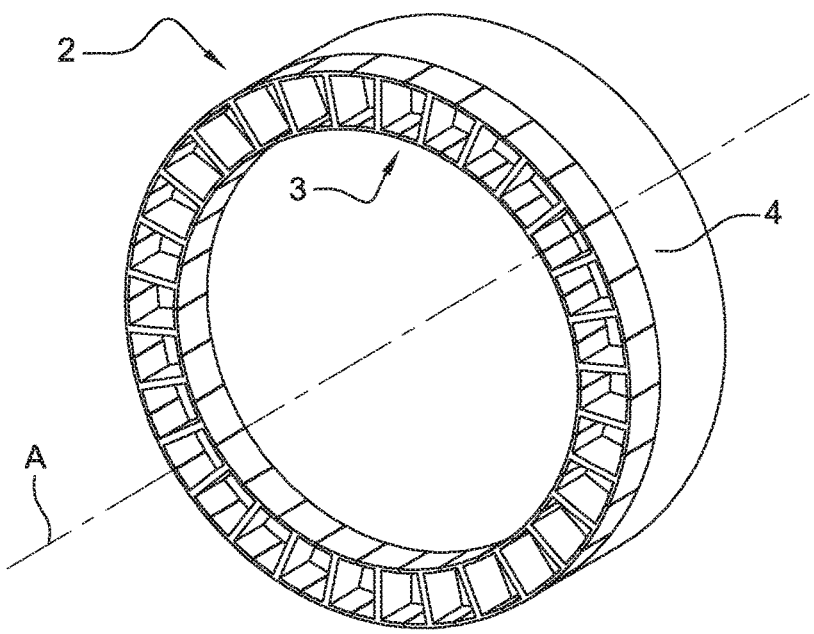
FIG. 2 is a schematic view showing an annular distributor and an annular structural element.

FIG. 2 schematically shows the assembling of the distributor 3 with the structural element 4.

Figure 6:
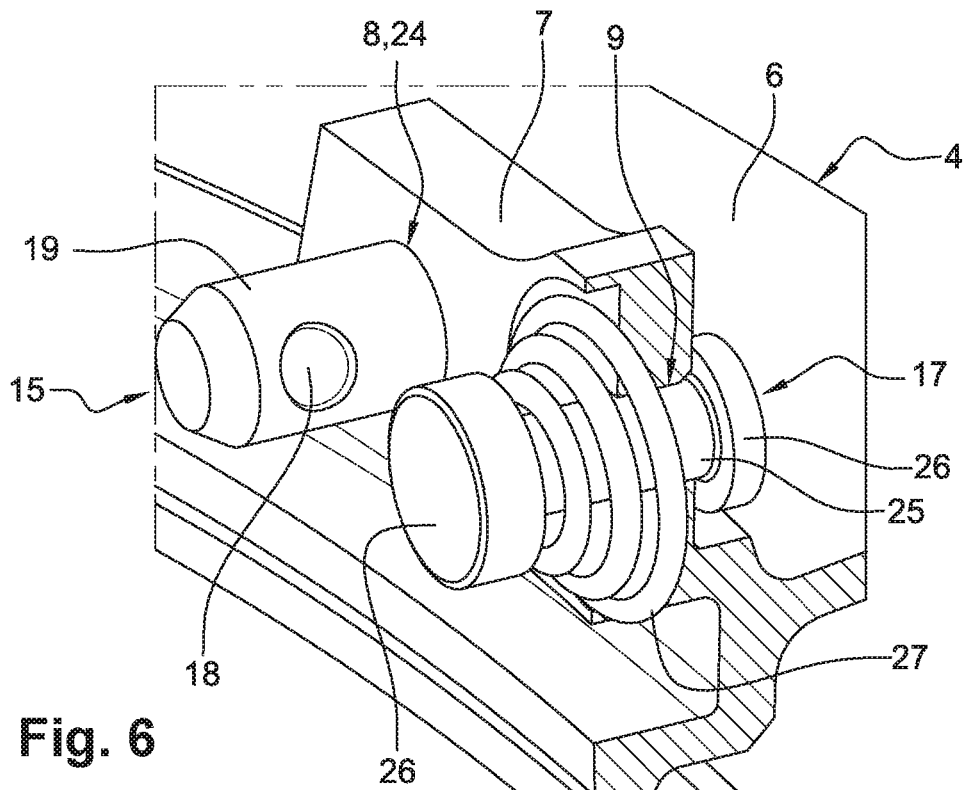
FIG. 6 is a sectional detailed view showing a stop according to a first alternative embodiment, and a pin of the device for attaching the assembly of FIG. 1.

The annular structural element 4, for example a stationary casing, has, on a radial external edge 6, at least one lug 7, here two, circumferentially distant from one another, and each provided with at least one first hole 8 and one second hole 9, with the holes 8, 9 being particularly visible in FIG. 6. Here, each lug 7 is provided with two first holes 8 circumferentially distant from one another and a second hole 9 located between the first two holes 8.

According to the figures, the distributor 3 comprises a plurality of sectors 3a, which together form the distributor 3. Thus, it will be understood that an attachment device 5 has to be used for each of the sectors 3a to be fixed. However, in the case of a distributor 3 formed in one piece, only one attachment device 5, or on the contrary, a plurality of attachment devices 5 could be used.

Each sector 3a comprises a first portion defining an outer shroud 10, with a second portion (not shown in the figures) forming an inner shroud, and a third portion forming a vane 11 joining the inner shroud 10 and the outer shroud.

In line with the outer shroud 10, each sector 3a of the distributor 3 comprises two tabs 12 circumferentially distant from one another and each being provided with a passage 13 adapted to come opposite the first hole 8 of a lug 7 of the structural element 4. Preferably, and as shown in the drawings, the tabs 12 of each sector 3a protrude from the outer shroud 10 outwardly from the distributor 3 and are located close to each circumferential end of the sector 3a.

The distributor 3 also has spaces 14 formed at least partially between two tabs 12 of two adjacent sectors 3a. The role of these spaces 14 will be explained hereunder.

In the case of a distributor 3 in a single piece, the latter comprises a plurality of tabs 12 which may be in pairs or alone, with the tabs 12 or the pairs of tabs 12 then being regularly distributed circumferentially along the outer shroud 10. In this case too, the spaces 14 are formed between two successive tabs 12.

The attachment device 5, shown in its entirety in FIG. 1, comprises two pins 15, a first transverse stop 16 for axial stopping and two second stops 17.

Each pin 15 is adapted to engage with the annular structural element 4 by passing through a first hole 8 of the lug 7 and a passage 13 of a tab 12, facing one another. Each pin 15 is further crossed by a through-opening 18 in which the first transverse stop 16 for axial stopping is accommodated, as discussed hereunder.

For ease of insertion thereof, each of the pins 15 has a size smaller than that of the passages 13 of the tabs 12. In other words, the passages 13 of the distributor 3 have a diameter greater than a diameter of the pins 15, which enables the accurate positioning of the distributor 3 or of each sector 3a. In addition, one of the passages 13 has an oblong shape to facilitate the positioning of the distributor 3 or of each sector 3a of the distributor 3.

The pins 15 are also used as stops for circumferentially stopping the distributor 3 or each of the sectors 3a of the distributor 3.

Figure 3:
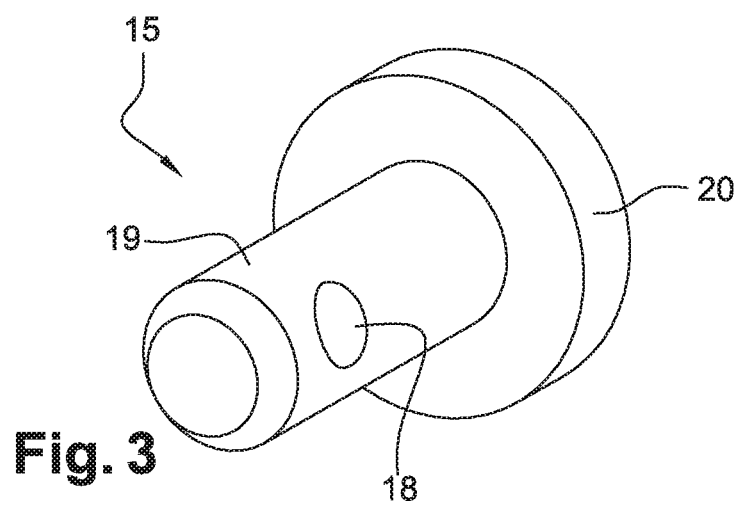
FIG. 3 is a detailed view of a pin of the attachment device according to a first embodiment.

According to a first embodiment, shown in FIG. 3, each pin 15 consists of a rod 19 adapted to successively pass through a first hole 8 of a lug 7 and a passage 13 of a tab 12, and a head 20 adapted to abut against the lug 8 for locking the pin 15 in a translational movement parallel to the axis of revolution A of the assembly 2. The opening 18 is provided in the rod 19 substantially perpendicularly to the direction of extension of the rod 19, i.e. substantially perpendicularly to the axis A of revolution of the assembly 2 when the pin 15 is mounted on the assembly 2.

Figure 5:
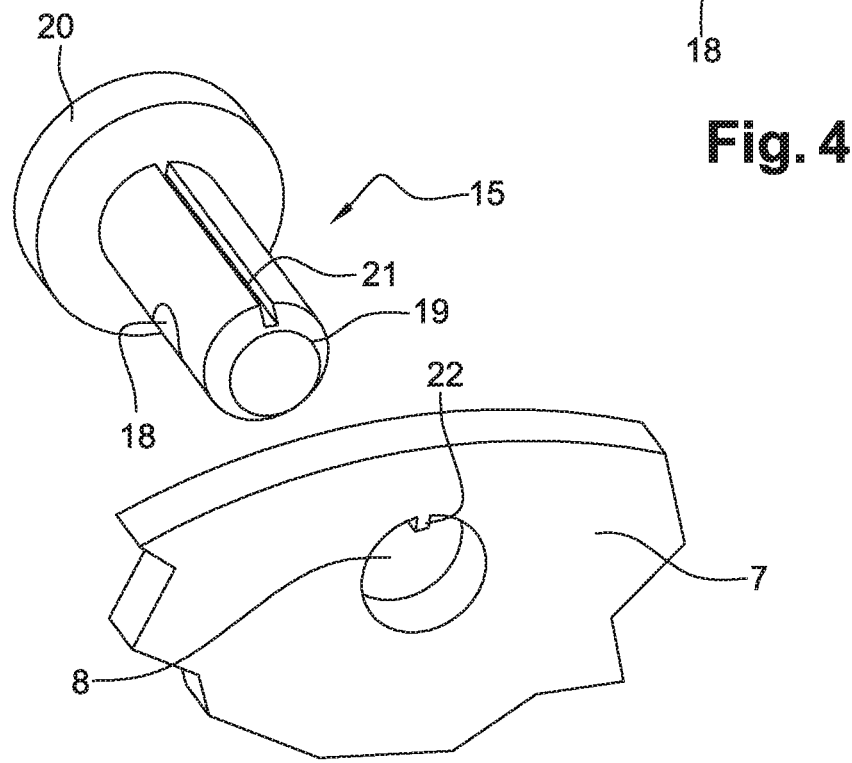
FIG. 5 is a view showing a pin according to a third embodiment.

According to a second alternative embodiment, shown in FIG. 5, the pin 15 is similar to the first embodiment but the rod 19 has a groove 21 adapted to receive a tooth 22 secured in a first hole 8 of a lug 7 or a passage 13 of a tab 12 which the pin 15 goes through, in order to lock the rod 19 in rotation.

Figure 4:
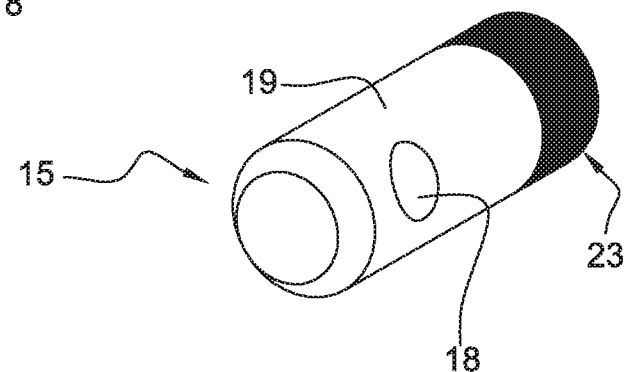
FIG. 4 is a view showing a pin according to a second embodiment.

According to a third alternative embodiment shown in FIG. 4, the pin 15 has no head 20 and the rod 19 includes a threaded portion 23 adapted to come into helical engagement with an inner thread 24 of a first hole 8 of the annular structural element 4.

The first transverse stop 16 for axial stopping is in the form of a rectilinear solid link and is preferably made of a resistant material such as steel for example. The first transverse stop 16 for axial stopping is then adapted to be accommodated in the opening 18 of two successive pins 15.

The second stops 17 circumferentially retaining the first transverse stop 16 for axial stopping, are each in a second hole 9 located on either side of a first transverse stop 16 for axial stopping and a space 14 of the distributor, as will be explained hereunder.

According to a first alternative embodiment, shown in FIG. 6, each second stop 17 comprises:
- a core 25 adapted to go through one said second hole 9 and two plates 26, each axially forming a rim on either side of a lug 7, and
- return means 27 for pulling away from the lug 7 one of the plates 26 so as to circumferentially lock the first transverse stop 16 for axial stopping.

The return means 27 preferably is a coil spring but may be a blade or any other means which can elastically deform and return to an initial position in the absence of any stress.

Thus, each second stop 17 can take a locking position wherein the one of the plates 26 is opposite the opening 18 of a pin 15 and prevents the first transverse stop 16 for axial stopping from disengaging from the openings 18 in the pins 15, and a retracted position wherein the return means 27 is elastically deformed and said plate 26 is spaced from the opening 18 of said pin 15 so as to enable the transverse stop 16 for axial stopping to disengage from the openings 18 of the pins 15 in which it is located.

Means for retaining the second stops 17 in the retracted position may also be provided so that the operator does not have to hold the second stop 17 in the retracted position thereof to be able to remove the first transverse stop 16 for axial stopping.

Advantageously, in this first alternative embodiment, the stops are pre-mounted on the annular structural element 4.

Figure 7:
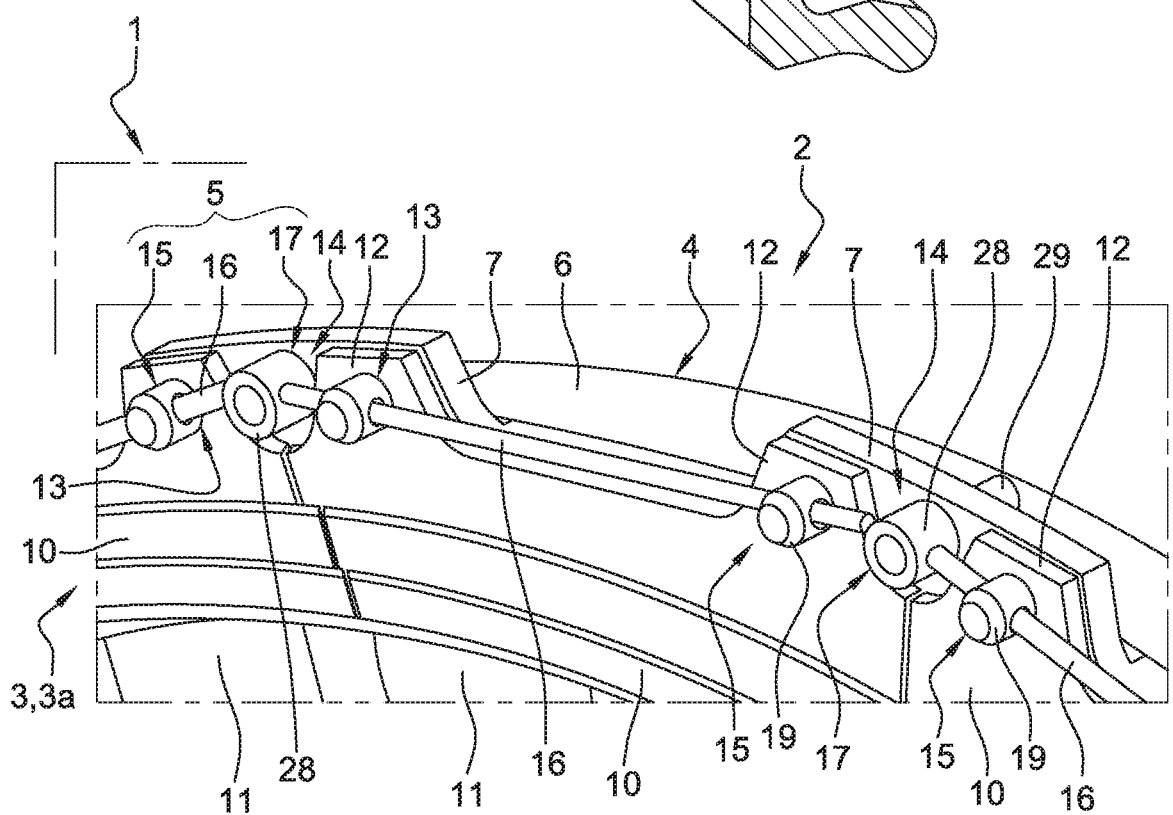
FIG. 7 is a detailed view similar to FIG. 1 showing a stop according to a second alternative embodiment.

According to a second alternative embodiment, shown in FIG. 7, each second stop 17 comprises an axial screw 28 in axial engagement with the annular structural element 4 and extending opposite the opening 18 of a pin 15 and a first transverse stop 16 for axial stopping so as to lock same.

For example, the second stop 17 may comprise a screw 28 and a nut 29 or simply a screw 28 engaging into a thread of the second hole 9 of the lug 7.

The dimensions of the second stops 17 and the positioning of the first and second holes 8, 9 of the lugs 7 on the structural element 4 are advantageously so selected that two adjacent first transverse stops 16 for axial stopping can be inserted into or removed from the openings 18 of the pins 15, independently of one another, without said first transverse stops 16 for axial stopping abutting against each other.

In order to reduce the number of parts required and the weight of the assembly 2, a second stop 17 can be used to lock two first transverse stops 16 for axial stopping, each belonging to a different attachment device 5, as shown in FIGS. 1 and 6.

To assemble a set 2 as has just been described, an operator carries out the following operations.

First, the operator positions a first sector 3a of the distributor 3 and then inserts the pins 15 so that each pin 15 passes through a first hole 8 of the lug 7 and the passage 13 of a tab 12 and engages with the lug 7, either supported, for pins 15 according to the first and second embodiments, or helically engaged with the inner thread 24 of a first hole 8, for pins 15 according to the third embodiment.

In an alternative solution, the operator may first place the pins 15 and then position the sectors 3a.

However, the pins 15 could be already mounted by shrinking for example, on the annular structural element 4 or even formed as an integral part with the element 4.

When the sectors 3a and the pins 15 are properly positioned, the operator inserts a first transverse stop 16 for axial stopping into the opening 18 of two pins 15 in engagement with the same sector 3a.

In the case of an assembly 2 comprising stops 15 according to the first alternative embodiment, the operator presses one of the second stops 17 against the coil spring, so that the opening 18 of an adjacent pin 15 is accessible, and then inserts the first transverse stop 16 for axial stopping until the latter comes into contact with a second, successive, stop 17. When the first transverse stop 16 for axial stopping is inserted, the operator can release the pressure exerted onto the second stop 17, with the latter then returning to its locking position because of the stress from the helical spring. On the contrary, in the case of an assembly comprising second stops 17 according to the second alternative embodiment, the operator must remove the screw 28 to be able to insert the first transverse stop 16 for axial stopping into the openings 18 of two pins 15. For this purpose, the user may use tools such as wrenches and/or screwdrivers, or, if the screw 28 or the nut 29 is provided with lugs, act on such lugs.

When the first transverse stop 16 for axial stopping is properly positioned, the operator places the or each second stop 17 back into the locking position thereof, for second stops 17 of the type mentioned in the first alternative embodiment, or positions one or more second stop(s) 17, for second stops 17 of the type mentioned in the second alternative embodiment.

When assembling an assembly 2 comprising two adjacent attachment devices 5 sharing a second stop 17, the operator places, in the retracted position thereof, the two stops 17 between which the first stop 16 of a first device 5 is accommodated. The operator then shifts the first stop 16 of the first device in a direction opposite the first stop 16 of the second adjacent device 5, so that the first stop 16 of the second device 5 can be inserted into the openings 18 of the two pins 15 of the second device 5. Once the first stop 16 of the second device 5 is positioned, the operator correctly repositions the first stop 16 of the first device 5 then places the second stops 17 of the two devices 5 in the locking position thereof, with one of the second stops 17 locking the first stops 16 of the two attachment devices 5.

Figure 8:
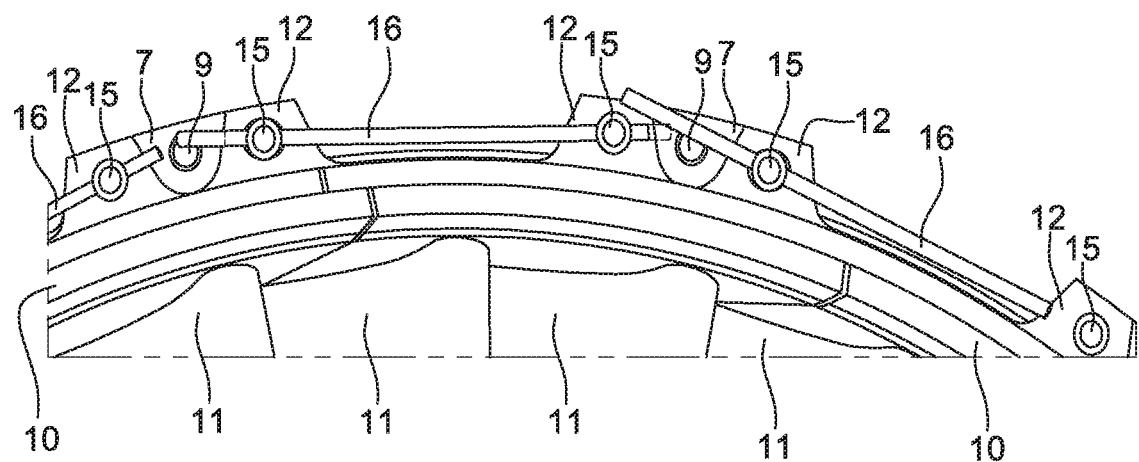
FIG. 8 shows one step of a method for mounting the assembly of FIG. 1.

This operation is shown in FIG. 8, wherein the first stop 16, already positioned, is shown in dotted lines prior to being shifted.

For disassembling the assembly 2, the operator performs the assembling operations which have just been described, in the reverse order.

An assembly 2, as has just been described, has many advantages.

First, the assembling and disassembling operations of a distributor 3 or one or more sector(s) 3a of the distributor 3 can be simple and quick. To this end, using tools is an option according to the alternative embodiment of the second stops 17 provided in the assembly 2.

Secondly, the number of parts is reduced as well as the weight thereof, which thus limits the mass of the assembly 2 and, consequently, the mass of the turbomachinery 1.

Thirdly, the distributor 3 (or the sectors 3a thereof) is easily accessible to an operator since the second stops 17, the first transverse stop 16 for axial stopping and the openings 18 of the pins 15 are located on the upstream side of the turbomachinery 1, where space is less restricted.

Eventually, the cost of the attachment device 5 is low, thanks to the simple design of each part the device 5 is made of. Thus, the replacement of a part of the device 5 can be quick and easy, unlike the replacement of the complex retaining part of the prior art, for instance.

The invention claimed is:

1. An assembly (2) comprising an annular turbine distributor (3) for turbomachinery (1), an annular structural element (4) of the turbomachinery (1), coaxial with the annular turbine distributor (3) and at least one attachment device (5) for attaching the annular turbine distributor (3) with the annular structural element (4), characterized in that:
the annular turbine distributor (3) is crossed by at least two axial passages (13), and
the at least one attachment device (5) comprises:
at least two pins (15) which are secured to the annular structural element (4) and passing through one of said at least two axial passages (13) of the annular turbine distributor (3), with each of said at least two pins (15) being further crossed by an opening (18),
a first transverse stop (16) for stopping the annular turbine distributor (3) axially and passing through the openings (18) of the at least two pins (15), where the at least two pins (15) are consecutive, and
two second stops (17) for retaining the first transverse stop (16) which are secured to the annular structural element (4) to retain the first transverse stop (16) in the openings (18) of the at least two pins (15).

2. The assembly (2) according to claim 1, wherein the annular structural element (4) has at least one first hole (8) and at least one second hole (9).

3. The assembly (2) according to claim 2, wherein the annular turbine distributor (3) comprises at least two tabs (12) positioned circumferentially away from one another and each having one of said at least two axial passages (13) adapted to come opposite said at least one first hole (8) of the annular structural element (4).

4. The assembly (2) according to claim 2, wherein the at least two pins (15) are movable relative to the annular structural element (4) and each pass through said at least one first hole (8).

5. The assembly (2) according to claim 2, wherein the two second stops (17) are adapted for circumferentially retaining the first transverse stop (16) are each accommodated in one said second hole (9).

6. The assembly (2) according to claim 2, wherein the annular structural element (4) has, on a radially external edge (6), at least two lugs (7) positioned circumferentially away from one another and each provided with said at least one first (8) and second holes (9).

7. The assembly (2) according to claim 1, wherein each of the two second stops (17) is movable relative to the annular structural element (4) and is accommodated in a space (14) of the annular turbine distributor (3).

8. The assembly (2) according to claim 1, wherein the annular turbine distributor (3) comprises a plurality of circumferentially adjacent sectors (3a), with each sector (3a) having at least two of said at least two axial passages (13) and at least a portion of a space (14).

9. The assembly (2) according to claim 1, wherein at least one of said at least two axial passages (13) of the annular turbine distributor (3) has a diameter greater than a diameter of at least one of the at least two pins (15) to ensure an accurate positioning of the annular turbine distributor (3).

10. The assembly (2) according to claim 1, wherein the at least two pins (15) are respective circumferential stops of the annular turbine distributor.

11. Turbomachinery (1) comprising the assembly (2) according to claim 1.

12. A method for assembling the assembly (2) according to claim 1, wherein the at least one attachment device (5) comprises at least a first attachment device (5) and an, adjacent second attachment device (5) sharing one of the two second stops (17), with the method comprising the following steps:
positioning the at least two pins (15) of the first attachment device (5) on the annular structural element (4);
positioning the two second stops (17) of the first attachment device (5) in a retracted position;
inserting the first transverse stop (16) of the first attachment device (5) through the openings (18) of the at least two pins (15) of the first attachment device (5);
shifting the first transverse stop (16) of the first attachment device (5) in a direction opposite the second attachment device (5);
positioning the at least two pins (15) of the second attachment device (5) on the annular structural element (4);
inserting the first transverse stop (16) of the second attachment device (5) through the openings (18) of the at least two pins (15) of the second attachment device (5);
positioning the two second stops (17) of the two attachment devices (5) in a locking position, with one of the two second stops (17) then locking the first transverse stops (16) of the two attachment devices (5).

13. The method according to claim 12, wherein the step of positioning the at least two pins (15) of the first attachment device (5) and the second attachment device (5) on the annular structural element (4) is carried out prior to the positioning of the first stop (16) of the first attachment device (5) and the second attachment device (5) respectively.

* * * * *